(12) United States Patent
Johnston

(10) Patent No.: US 6,607,241 B2
(45) Date of Patent: Aug. 19, 2003

(54) STORAGE APPARATUS THAT ATTACHES TO A VEHICLE SEAT

(75) Inventor: Kent E. Johnston, Birmingham, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/938,034

(22) Filed: Aug. 23, 2001

(65) Prior Publication Data

US 2003/0038514 A1 Feb. 27, 2003

(51) Int. Cl.⁷ ................................................. A47C 7/62
(52) U.S. Cl. .............................. 297/188.06; 297/188.2; 297/163
(58) Field of Search ....................... 297/188.06, 188.01, 297/188.04, 188.05, 188.2, 378.1, 135, 163, 173, 188.21

(56) References Cited

U.S. PATENT DOCUMENTS

| | | | | |
|---|---|---|---|---|
| 1,398,496 A | * | 11/1921 | Saltalamachia | |
| 2,100,261 A | | 11/1937 | Montgomery | 224/29 |
| 2,252,310 A | * | 8/1941 | Waldman | |
| 3,572,562 A | * | 3/1971 | Floyd, Jr. | |
| 3,594,039 A | | 7/1971 | Harp | 297/252 |
| 4,443,034 A | | 4/1984 | Beggs | 296/65 |
| 4,726,621 A | * | 2/1988 | Muller | |
| 4,792,183 A | * | 12/1988 | Townsend, III | |
| RE33,423 E | * | 11/1990 | Lobanoff | |
| 5,046,433 A | | 9/1991 | Kramer et al. | 108/44 |
| 5,269,229 A | | 12/1993 | Akapatangkul | 108/44 |
| 5,273,336 A | * | 12/1993 | Schubring et al. | |
| 5,370,060 A | | 12/1994 | Wang | 108/44 |
| 5,443,018 A | | 8/1995 | Cromwell | 108/44 |
| 5,678,741 A | | 10/1997 | Schieber | 224/275 |
| 5,791,614 A | * | 8/1998 | Sims | |
| 5,813,354 A | | 9/1998 | Scott | 108/44 |
| 5,921,605 A | | 7/1999 | Musukula et al. | 296/63 |
| 5,931,527 A | | 8/1999 | D'Onofrio et al. | 297/146 |
| 5,947,033 A | * | 9/1999 | Lombardo | |
| 5,967,054 A | | 10/1999 | Rosenfeld | 108/44 |
| 6,105,839 A | | 8/2000 | Bell | 224/275 |
| 6,142,561 A | * | 11/2000 | Pesta et al. | |
| 6,450,378 B1 | * | 9/2002 | Miller | |

OTHER PUBLICATIONS

Copy of International Search Report for PCT/Us02/26392.

* cited by examiner

Primary Examiner—Milton Nelson, Jr.
(74) Attorney, Agent, or Firm—Myers Bigel Sibley & Sajovec

(57) ABSTRACT

A storage apparatus is provided that attaches to a vehicle seat backrest and that can support one or more shelves when the backrest is in an upright position and that can support a table when the backrest is in a folded position. The storage apparatus includes a pair of elongated side members for supporting one or more panels that can serve as shelves or as a table, depending upon the position of the seat backrest.

64 Claims, 11 Drawing Sheets

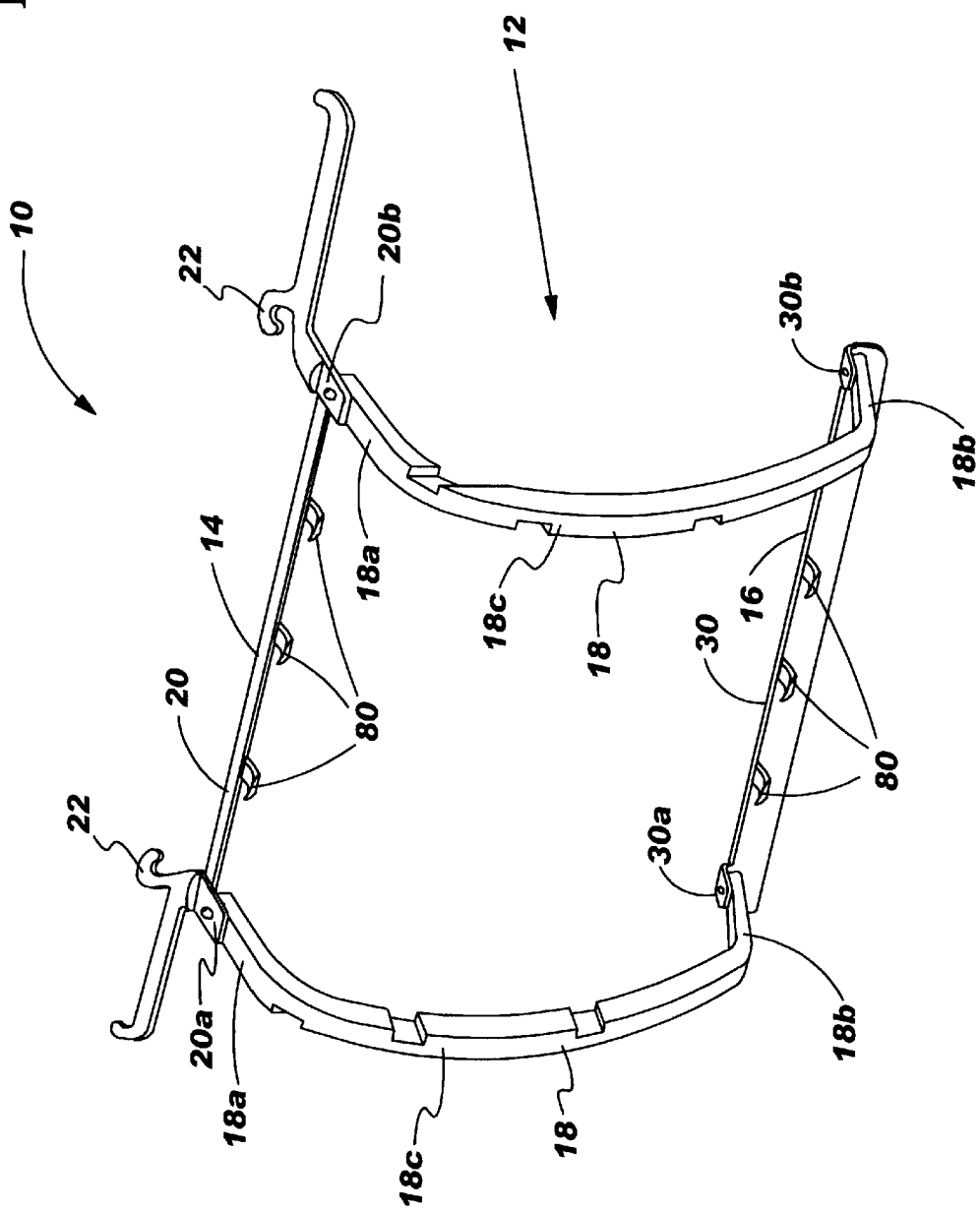

Horizontal Shelf Configuration

Horizontal Table Configuration

Table

Shelves

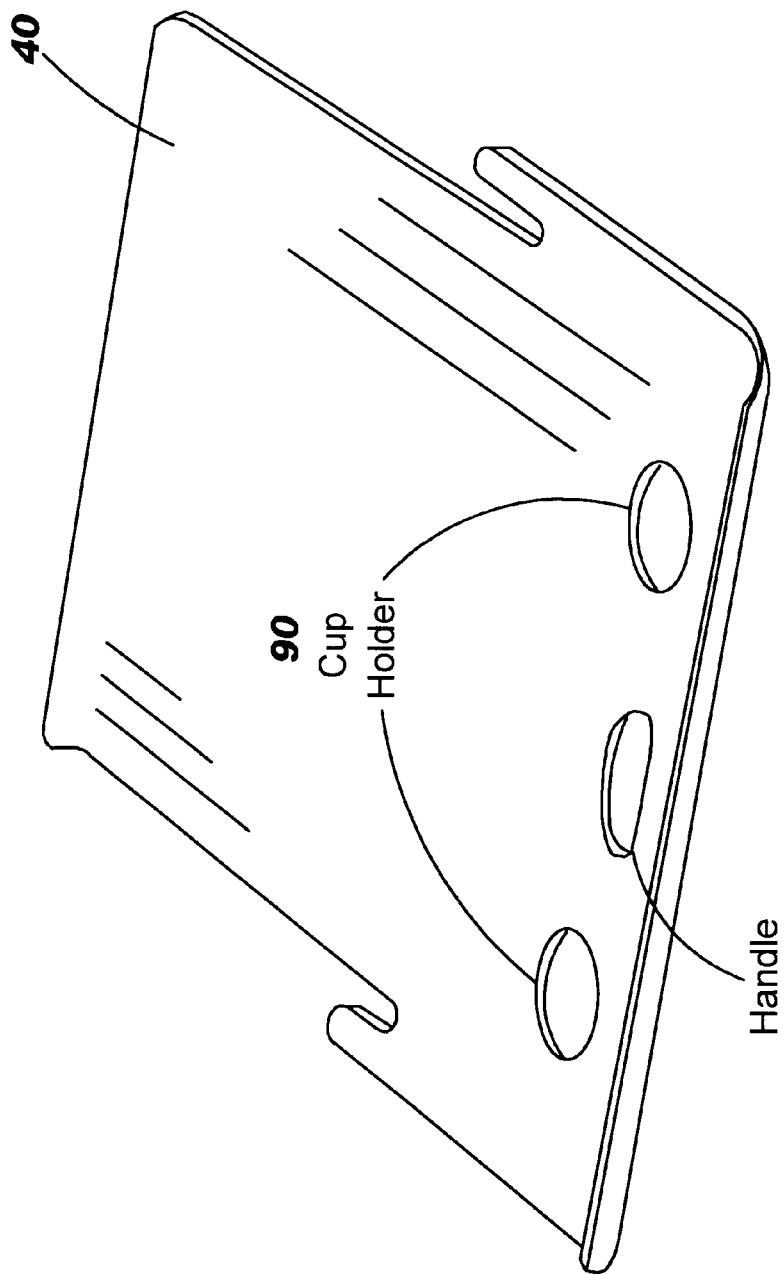

STORAGE APPARATUS THAT ATTACHES TO A VEHICLE SEAT

FIELD OF THE INVENTION

The present invention relates generally to vehicles and, more particularly, to cargo management apparatus for use within vehicles.

BACKGROUND OF THE INVENTION

In sport/utility and mini-van vehicles, generally there are two or more rows of seating. Conventionally, behind the last row of seating is a cargo storage area. Unfortunately, in automotive vehicles such as sport/utility vehicles and mini-vans, cargo storage space may be somewhat limited. Accordingly, a need exists to maximize the efficiency and utilization of existing cargo storage space without intruding on passenger space.

SUMMARY OF THE INVENTION

In view of the above discussion, a storage apparatus is provided that attaches to a vehicle seat backrest and that can support one or more shelves when the backrest is in an upright position and that can support a table when the backrest is in a folded position. According to embodiments of the present invention a storage apparatus includes a frame having an upper cross member configured to be removably secured to a seat backrest, a lower cross member configured to be removably secured to a seat backrest, and a pair of elongated side members for supporting one or more panels that can serve as shelves or as a table, depending upon the position of the seat backrest.

According to embodiments of the present invention, the upper cross member includes one or more headrest support post hangers extending therefrom. Each headrest support post hanger is configured to be removably attached to a respective headrest support post extending from an upper portion of the seat backrest. According to embodiments of the present invention, a strap is configured to be secured to a seat backrest and the lower cross member is configured to be removably secured to the strap.

Each side member includes opposite first and second end portions and an arcuate intermediate portion extending therebetween. According to embodiments of the present invention, the first end portion of each side member is pivotally attached to the upper cross member and the second end portion is pivotally attached to the lower cross member such that the side members can pivot between a stored position and an operative position. The arcuate intermediate portions of the side members are in adjacent, spaced-apart relationship and bow outwardly away from the rear portion of the backrest when the side members are in an operative position. In a stored position, the arcuate intermediate portions bow are positioned adjacent the seat backrest and either extend away from each other or extend towards each other. According to embodiments of the present invention, the side members may be configured to interlock with each other when in the stored position.

One or more pairs of notches are formed within the respective side members in substantially mirror image relationship. Each pair of notches is configured to removably receive corresponding opposite edge portions of a panel therein. Each edge portion is configured to slidably communicate with a respective notch in the pair of notches such that the panel is supported by the side members in a substantially horizontal orientation. According to embodiments of the present invention at least one panel edge portion has a slot that communicates with a respective side member to removably interlock the panel to the respective side member.

According to embodiments of the present invention, one or more projections may extend from one or more of the upper cross member, lower cross member, and/or side members. Each projection is configured to support articles suspended therefrom (e.g., grocery bags).

According to embodiments of the present invention, a plurality of pairs of notches may be formed within respective side members in spaced-apart, substantially mirror image relationship. Each respective pair of notches is configured to slidably receive the opposite edge portions of a panel therein such that the panel can be supported in different positions. Additional panels may be utilized such that the panels are supported as shelves in a substantially horizontal orientation in adjacent, spaced-apart relationship.

Apparatus according to embodiments of the present invention may be lightweight and are designed for quick and easy installation and removal. Moreover, apparatus according to embodiments of the present invention can be interchangeably installed within various different vehicles. Apparatus according to embodiments of the present invention can be inexpensive to manufacture and do not require special brackets and/or attachments, and do not require vehicle modifications. In addition, apparatus according to embodiments of the present invention are configured to be stored out of the way when not in use.

BRIEF DESCRIPTION OF THE DRAWINGS

FIG. 1 is a perspective view of a storage apparatus that is configured to be removably attached to a vehicle seat, according to embodiments of the present invention.

FIG. 14 is a perspective view of a panel according to embodiments of the present invention that includes a pair of cup holders and a handle.

DETAILED DESCRIPTION OF THE INVENTION

Figure 3:
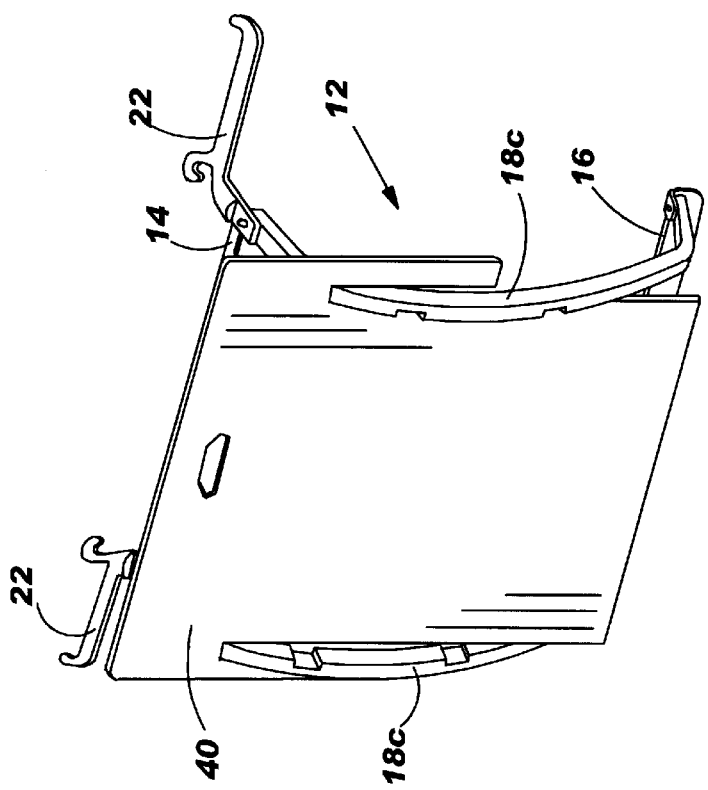
FIG. 3 is a perspective view of the storage apparatus of FIG. 1 with a panel supported thereby in a position such that the panel can serve the function of a table.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring initially to FIGS. 1–4, a storage apparatus 10 that is configured to be removably attached to a vehicle seat, according to embodiments of the present invention, is illustrated. The storage apparatus 10 includes a frame 12 that is configured to be supported from one or more headrest support posts located on a top portion of a vehicle seat backrest. The frame 12 includes an upper cross member 14, a lower cross member 16, and a pair of elongated side members 18. Each side member 18 has opposite first and second end portions 18a, 18b and an arcuate intermediate portion 18c extending therebetween. The first end portion 18a of each side member 18 is attached to the upper cross member 14 and the second end portion 18b of each side member 18 is attached to the lower cross member 16.

Figure 2:
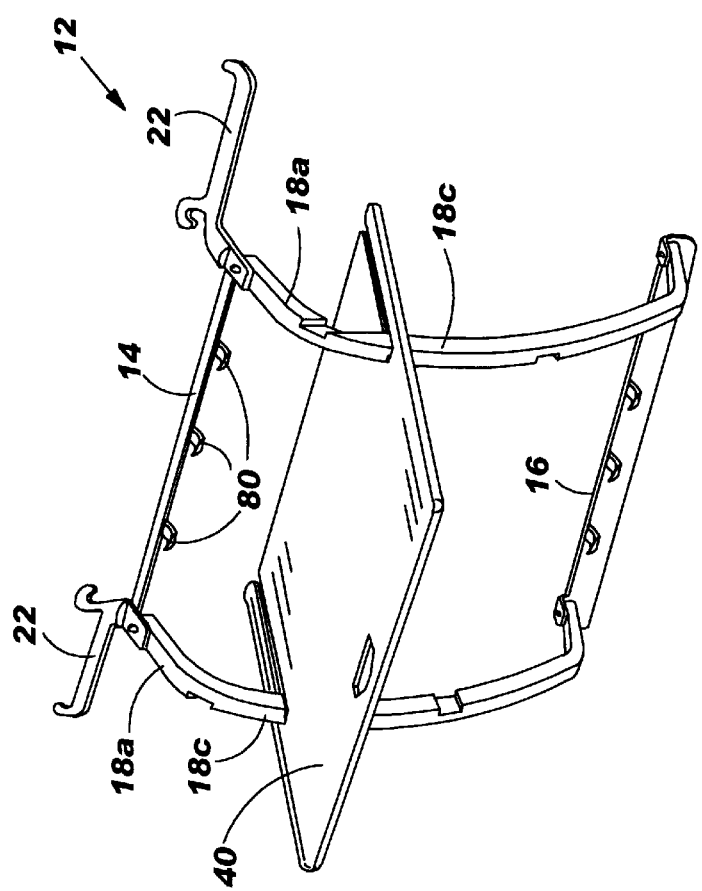
FIG. 2 is a perspective view of the storage apparatus of FIG. 1 with a panel supported thereby in a position such that the panel can serve the function of a shelf.
Figure 4:
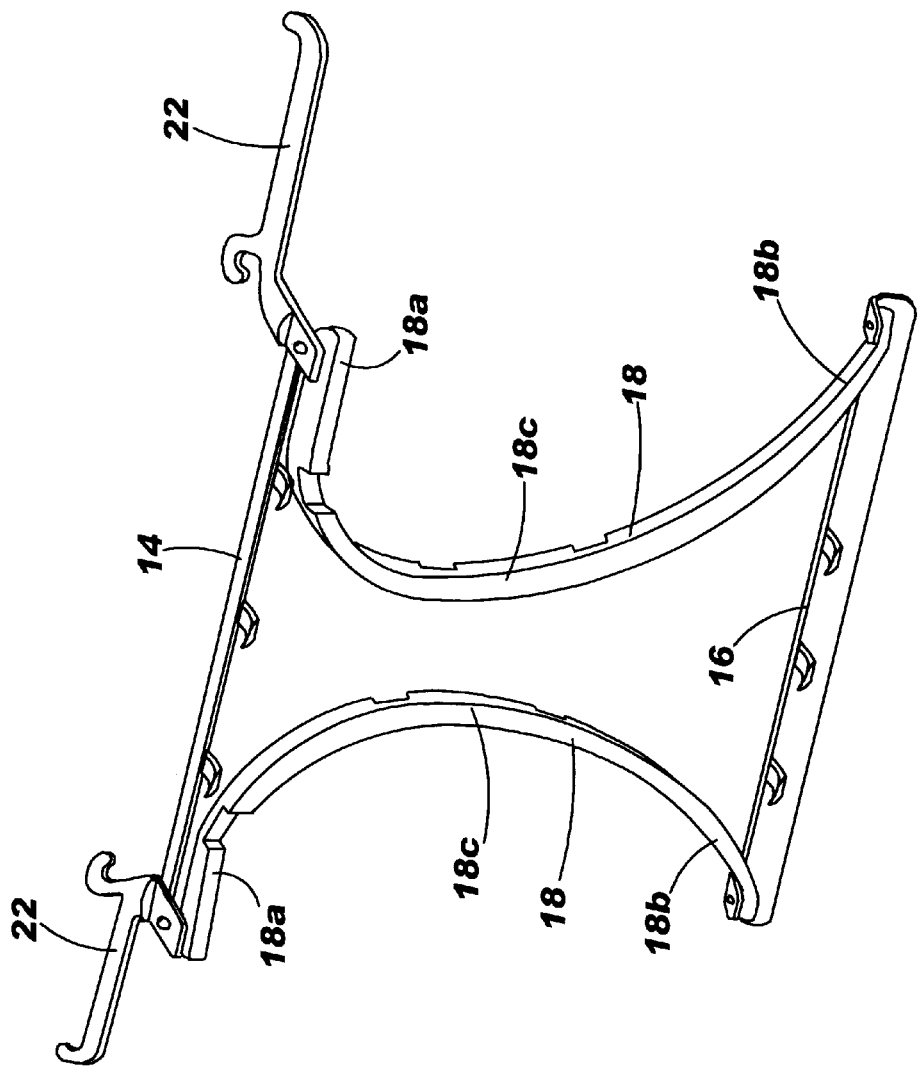
FIG. 4 is a perspective view of the storage apparatus of FIG. 1 in a stored configuration.

In the illustrated embodiment, the side members 18 are pivotally attached to the upper and lower cross members 14, 16 and are movable between a stored position (FIG. 4) and an operative position (FIGS. 1–3). In the illustrated stored position of FIG. 4, the arcuate intermediate portions 18c of the side members 18 bow towards each other. However, it is understood that the side members 18 may have a stored position wherein the arcuate intermediate portions 18c bow away from each other. The arcuate intermediate portions 18c of the side members 18 bow outwardly in adjacent, spaced-apart relationship when the side members 18 are in the operative position as illustrated in FIGS. 1–3.

According to alternative embodiments of the present invention, the side members 18 are configured to interlock with each other when in a stored position. For example, side member 18' of FIG. 12 includes apertures 19 that are configured to matingly engage respective members extending from the other side member (not illustrated) to thereby interlock the two side members together in a stored position. Various ways of interlocking and/or restraining a pair of side members may be utilized in accordance with embodiments of the present invention, including clamps, fasteners, etc.

Figure 10:
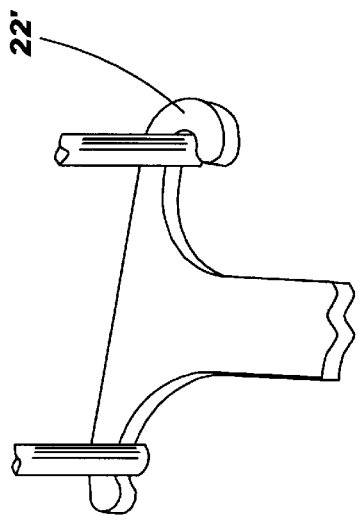
FIGS. 10–11 illustrate alternative headrest support post hanger configurations for the storage apparatus of FIGS. 1–4.
Figure 11:
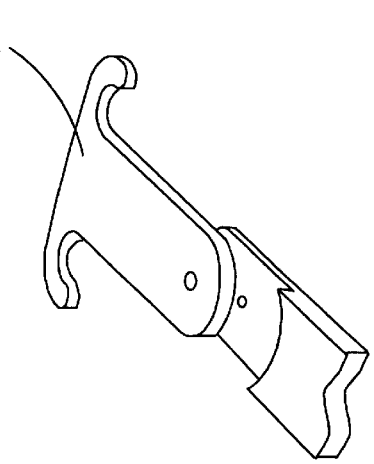

The illustrated upper cross member 14 has an elongated body portion 20 with opposite end portions 20a, 20b. A pair of headrest support post hangers 22 extend from the body portion 20 adjacent respective end portions 20a, 20b, as illustrated. Each hanger 22 is configured to be removably attached to one or more headrest support posts of a respective headrest connected to a vehicle seat backrest. Each hanger 22 may be removably secured to the body portion 20. Headrest support post hangers utilized in conjunction with embodiments of the present invention may have various configurations. For example, alternative headrest support post hanger configurations 22' and 22" are illustrated in FIGS. 10 and 11. The illustrated upper cross member 14 also includes a pair of projections 80 extending therefrom that are configured to support articles suspended therefrom (e.g., grocery bags).

The illustrated lower cross member 16 has an elongated body portion 30 with opposite end portions 30a, 30b. The illustrated lower cross member 16 also includes a pair of projections 80 extending therefrom that are configured to support articles suspended therefrom (e.g., grocery bags).

Figure 13B:
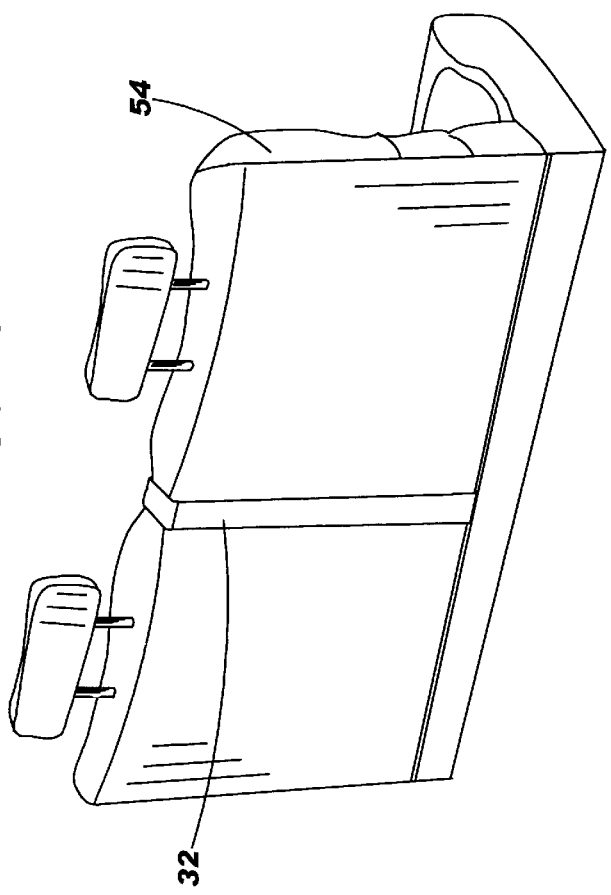
FIGS. 13A–13C illustrate a strap configured to be removably secured to a seat backrest and to which the lower cross member of the storage apparatus of FIGS. 1–4 is removably secured.
Figure 13C:
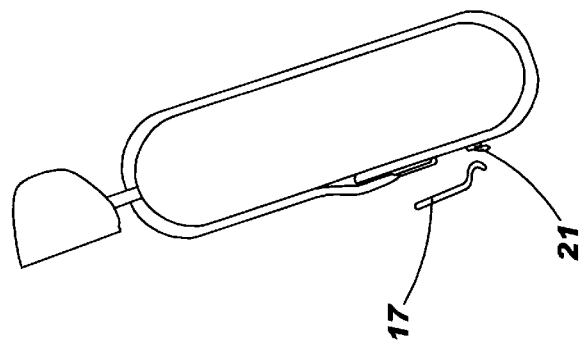
Figure 13A:
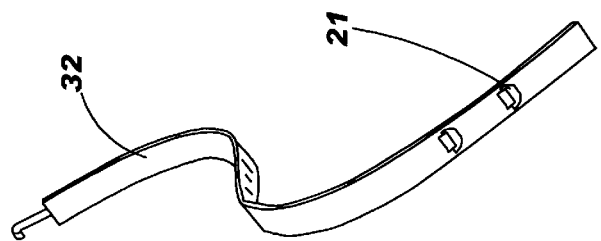

The lower cross member 16 is configured to be removably secured to the backrest of a vehicle seat. For example, a strap 32 (FIG. 13A) may be secured to a backrest 54 as illustrated in FIG. 13. The illustrated strap 32 includes a pocket 21 that is configured to removably receive a projection 17 extending from the lower cross member 16 (FIG. 13C). However, embodiments of the present invention are not limited to the use of a strap for removably securing the lower cross member 16 to a vehicle seat backrest. For example, the lower cross member 16 may be removably attached to various other portions of a vehicle seat.

Referring to FIGS. 2–3, the illustrated frame 12 is configured to removably support a panel 40 in a first position (FIG. 2) and in a second position (FIG. 3). When the panel 40 is in the first position (FIG. 2), the frame 12 is intended to be attached to a vehicle seat backrest with the backrest in a substantially upright position. Accordingly, the panel 40 has a generally horizontal orientation and can serve the function of a shelf such that articles can be stored thereon. When the panel 40 is in the second position (FIG. 3), the frame 12 is intended to be attached to a vehicle seat backrest with the backrest in a substantially folded position overlying a seat portion. Accordingly, the panel 40 has a generally horizontal orientation and can serve the function of a table such that articles can be stored thereon.

Figure 5:
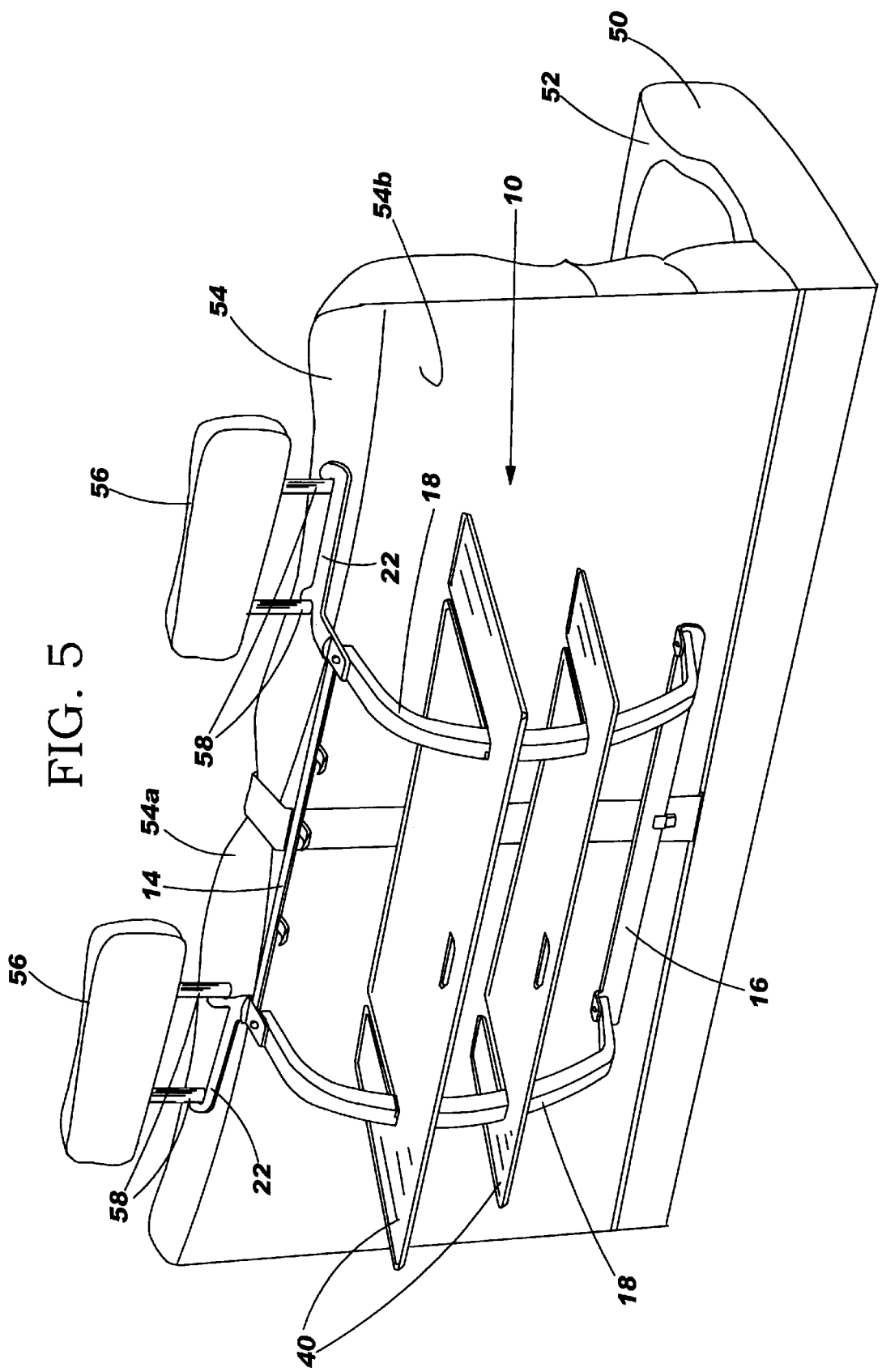
FIGS. 5–6 illustrate the storage apparatus of FIGS. 1–4 in an installed configuration on a vehicle seat backrest that is in an upright, substantially vertical position (FIG. 5), and a folded, substantially horizontal position (FIG. 6).
Figure 6:
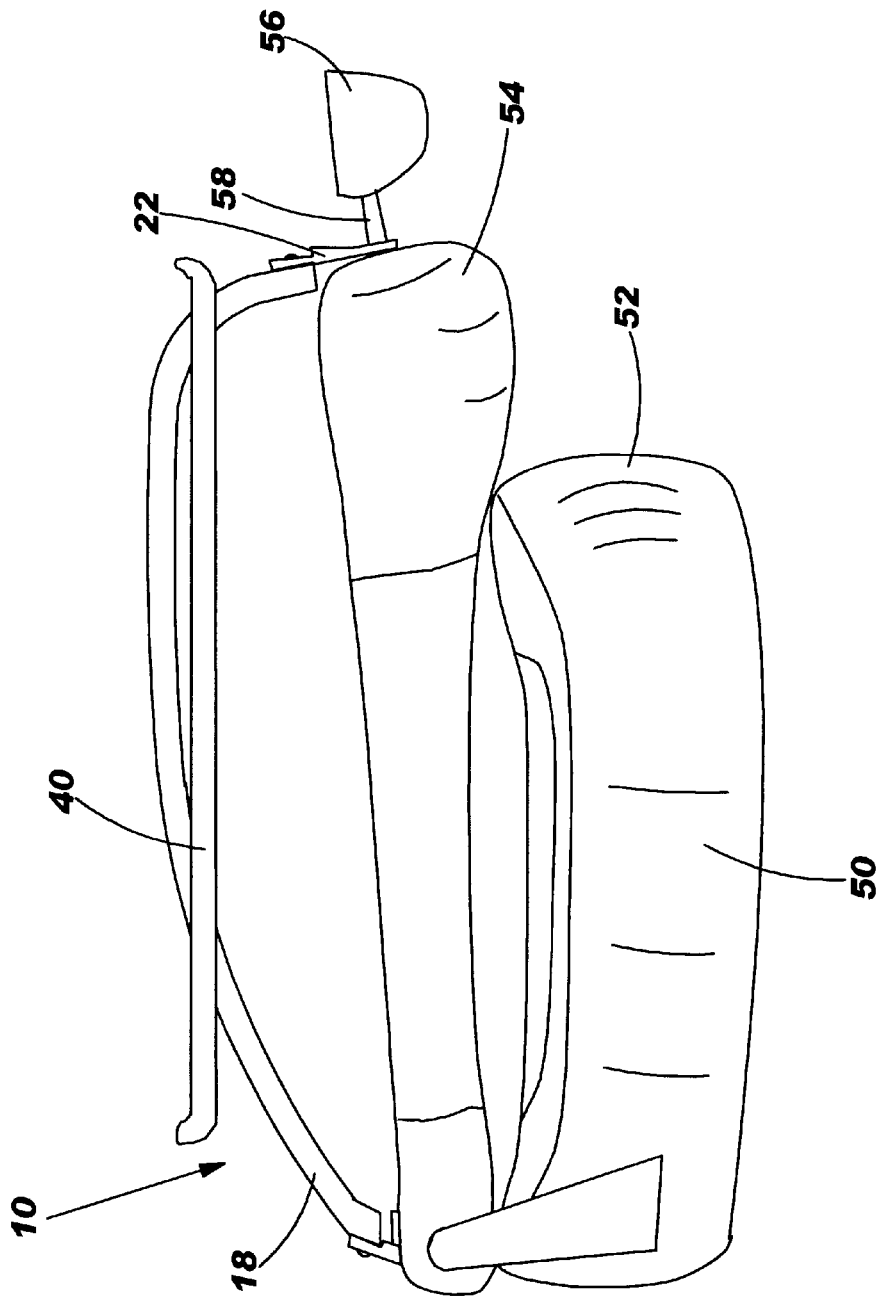

Referring now to FIGS. 5–6, the storage apparatus 10 of FIGS. 1–4 is illustrated in an installed configuration on a vehicle seat 50. The illustrated vehicle seat 50 includes a seat portion 52 and a backrest 54 pivotally attached to the seat portion 52 and movable between an upright, substantially vertical position (FIG. 5) and a folded, substantially horizontal position overlying the seat portion 52 (FIG. 6). The illustrated backrest 54 includes a top portion 54a and a rear portion 54b. A pair of headrests 56 are connected to the top portion 54a of the backrest 54 via respective support posts 58. Vehicle seats and headrests attached thereto are well understood by those skilled in the art, and will not be described further herein. Moreover, operations for pivoting a backrest portion of a vehicle seat between an upright position and a folded position are well understood by those skilled in the art, and will not be described further herein. Storage apparatus according to embodiments of the present invention may be utilized with any type of seat for use within any type of vehicle.

The storage apparatus 10 is secured to the rear portion 54b of the backrest 54 via the hangers 22 which are removably secured to the headrest support posts 58, and via the lower cross member 16 which is removably secured to the backrest 54. As illustrated in FIG. 5, one or more panels 40 may be removably secured to the side members 18 in a first position and serve the function of shelves for supporting articles thereon when the backrest 54 is in an upright position. As illustrated in FIG. 6, a single panel 40 is removably secured to the side members 18 in a second position and serves the function of a table when the backrest 54 is in a folded position.

Figure 7A:
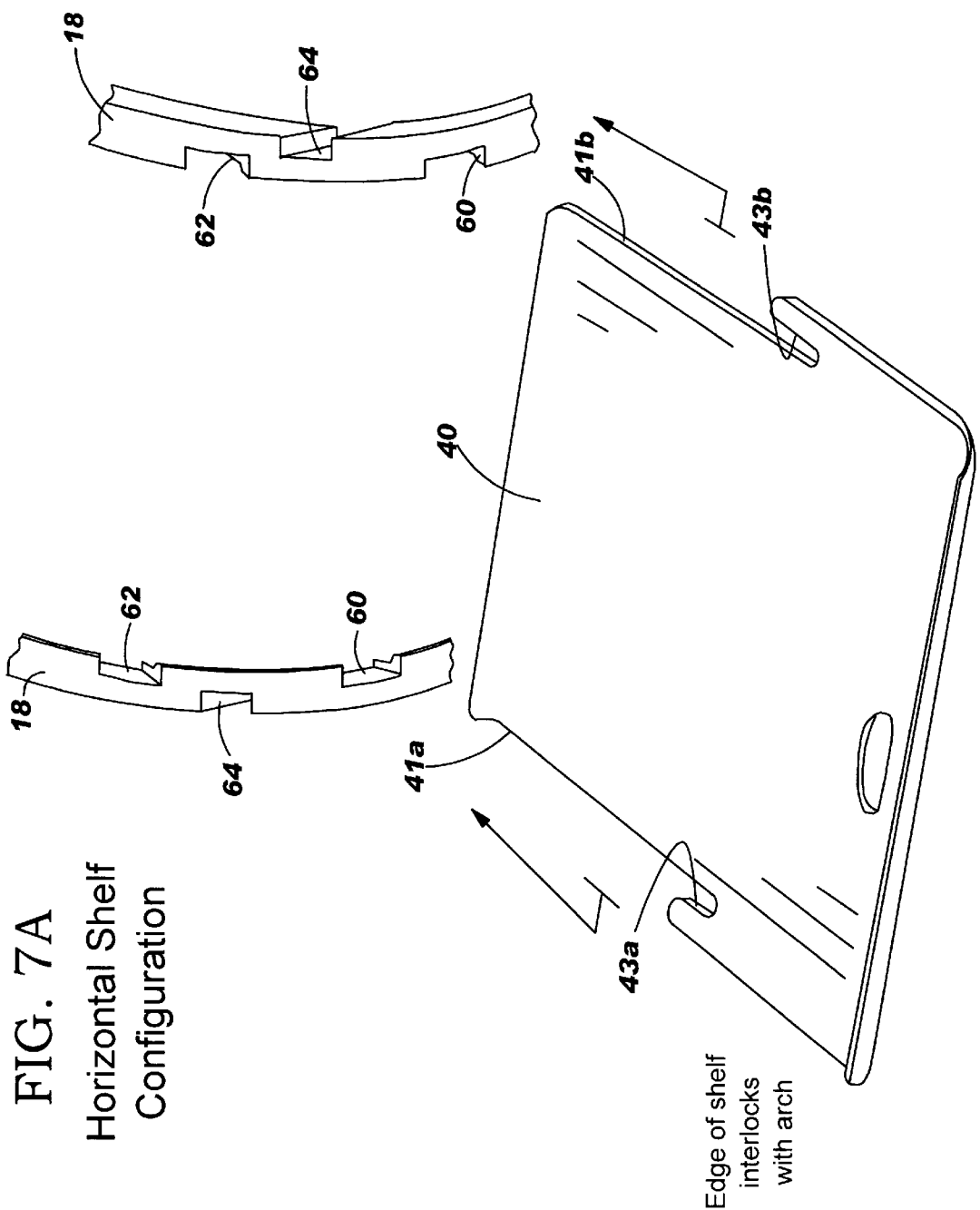
FIG. 7A is a partial perspective view of a pair of side members having respective first and second pairs of notches formed therein and that are configured to slidably receive one or more panels therein in a first generally horizontal orientation when a seat backrest from which the side members are supported is in an upright position (e.g., FIG. 5).
Figure 7B:
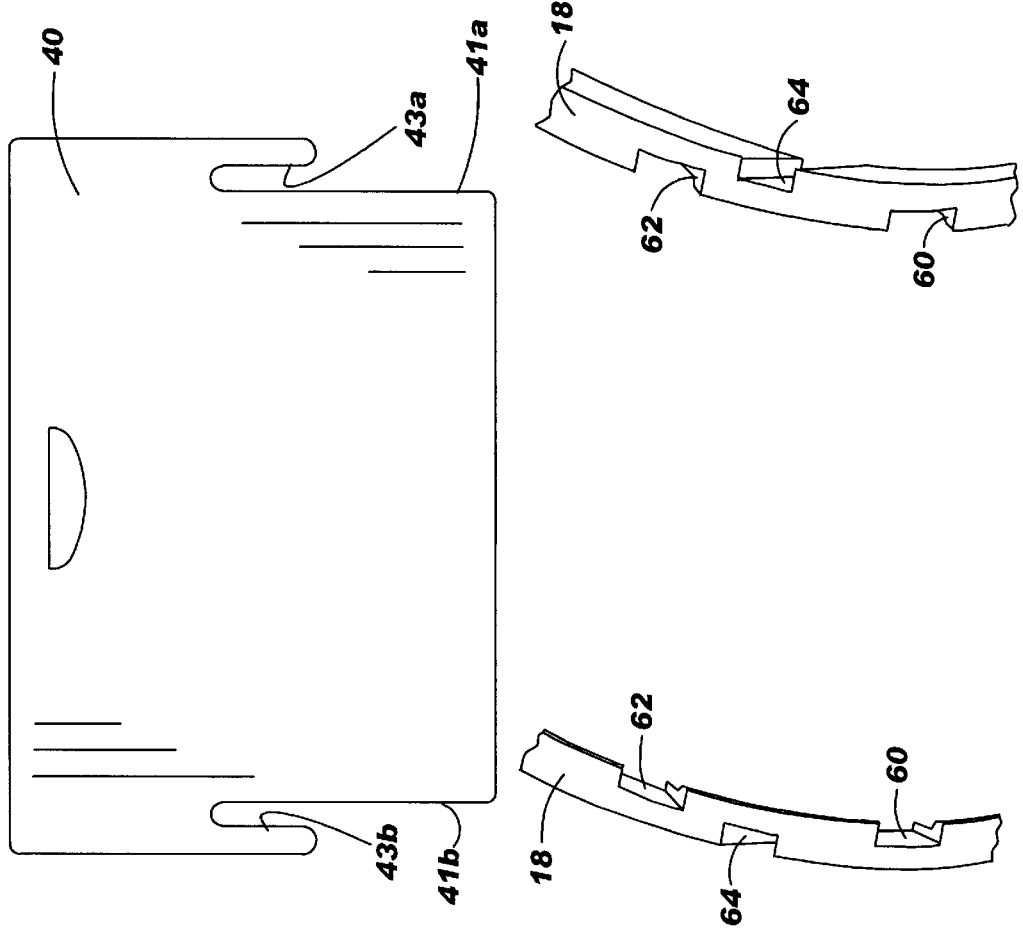
FIG. 7B is a partial perspective view of a pair of side members having a third pair of notches formed therein that are configured to slidably receive a panel therein in a second generally horizontal orientation when a seat backrest from which the side members are supported is a folded position (e.g., FIG. 6).

Referring now to FIGS. 7A–7B, an exemplary panel 40 for use with the storage apparatus 10 of FIGS. 1–4 is illustrated. The illustrated panel 40 includes a pair of opposite edge portions 41a, 41b that are configured to engage respective pairs of notches formed within the side members 18. Three pairs of notches 60, 62, 64 are formed within the respective side members 18 in substantially mirror image relationship. Embodiments of the present invention are not limited to the illustrated panel 40 or to the illustrated number and arrangement of notches in the side members 18. Panels having various shapes, sizes, and configurations may be utilized, without limitation. For example, according to an alternative embodiment illustrated in FIG. 14, panel 40 may include one or more cup holders 90 formed therein and/or extending therefrom.

As illustrated in FIG. 7A, the first pair of notches 60 are configured to slidably receive the respective edge portions 41a, 41b of the panel 40 therein such that the panel 40 is supported in a first generally horizontal orientation when a seat backrest 54 from which the side members 18 are supported is in an upright position (e.g., FIG. 5). The second pair of notches 62 are configured to slidably receive the respective edge portions 41a, 41b of the panel 40 therein such that the panel 40 is supported in a second generally horizontal orientation, spaced apart from the first generally horizontal orientation, when a seat backrest 54 from which the side members 18 are supported is in an upright position (e.g., FIG. 5). Two respective panels 40 may be supported by the respective first and second pairs of notches 60, 62 and serve as shelves when a seat backrest 54 from which the side members 18 are supported is in an upright position.

Figure 8:
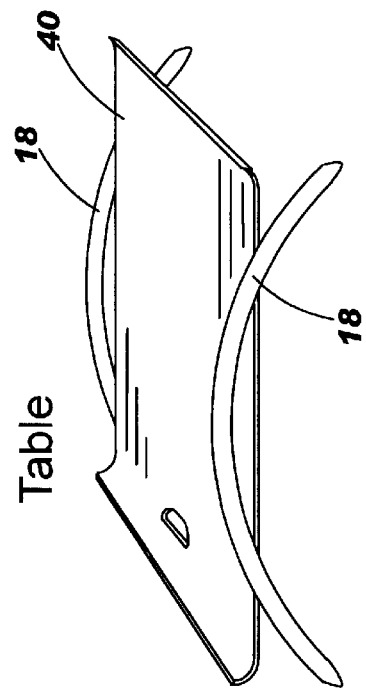
FIG. 8 is a perspective view of a pair of side members that illustrates the position of the side members when a seat backrest to which the side members are attached is in a folded position such that a panel supported by the side members may serve as a table.

As illustrated in FIG. 7A, the third pair of notches 64 are configured to slidably receive the respective edge portions 41a, 41b of the panel 40 therein such that the panel is supported in a generally horizontal orientation when a seat backrest 54 from which the side members 18 are supported is in a folded position overlying a seat portion (e.g., FIG. 6). Accordingly, the panel 40 may serve as a table as illustrated in FIG. 8.

The edge portions 41a, 41b of the illustrated panel 40 of FIGS. 7A–7B have respective slots 43a, 43b formed therein. Each slot 43a, 43b is configured to communicate with a respective side member 18 to removably interlock the panel 40 to the respective side member 18. Embodiments of the present invention are not limited to the illustrated configuration of slots 43a, 43b. Various slot configurations (including non-mirror image configurations) may be utilized without limitation. Moreover, only one edge portion (e.g., 41a or 41b) may have a respective slot formed therein.

Figure 9:
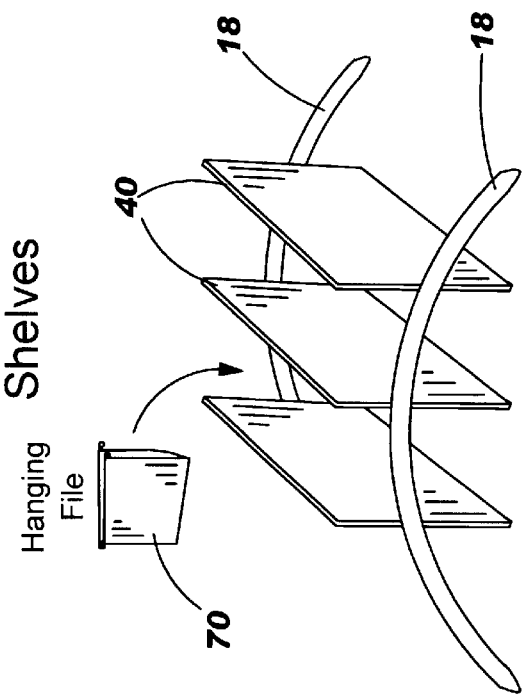
FIG. 9 is a perspective view of a pair of side members that illustrates the position of the side members when a seat backrest to which the side members are attached is in a folded position such that one or more hanging files can be supported by panels supported by the side members.

According to another embodiment of the present invention, one or more hanging files 70 may be supported by the side members 18 or by panels 40 supported by the side members (FIG. 9) when a seat backrest 54 from which the side members 18 are supported is in a folded position overlying a seat portion. Hanging files are well understood by those skilled in the art and need not be explained further. Exemplary hanging files that may be utilized in accordance with embodiments of the present invention are available from American Pad & Paper LLC of Plano, Tex.

Figure 12:
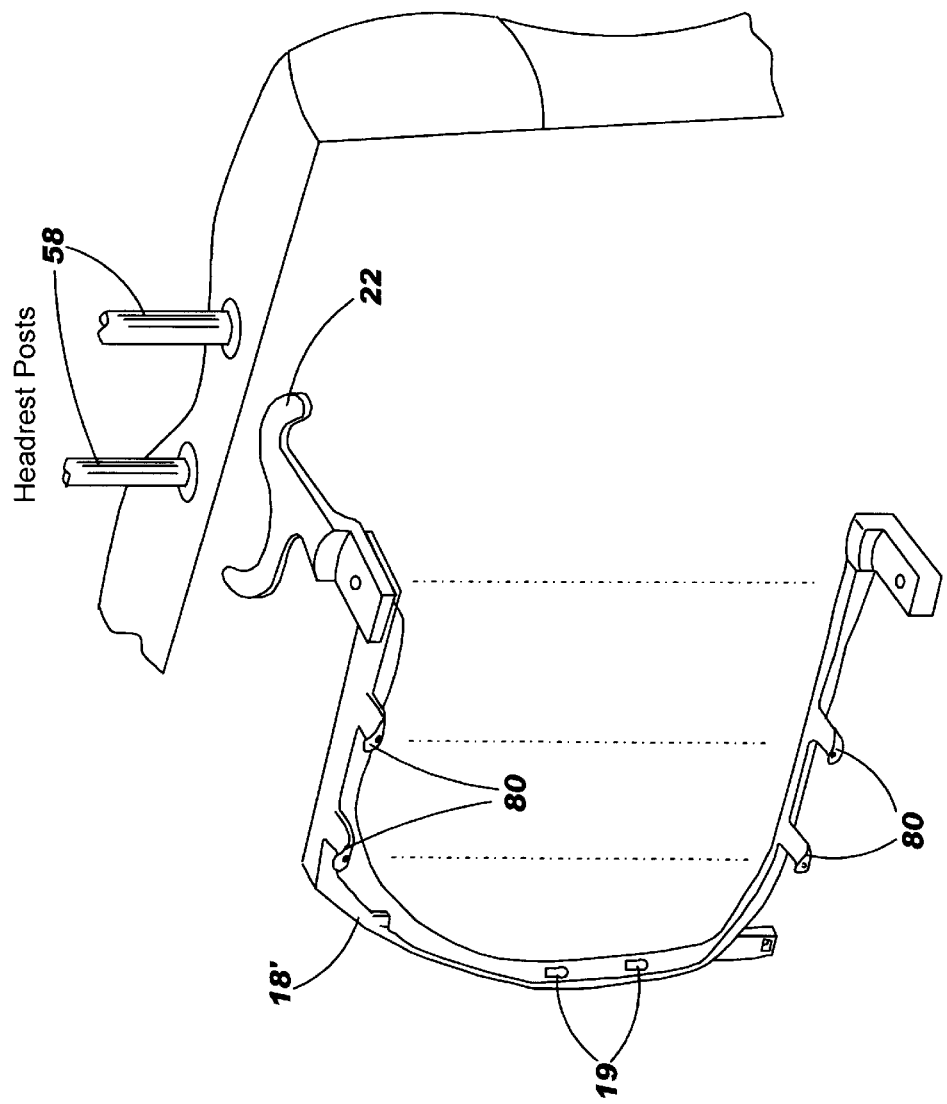
FIG. 12 is a perspective view of a side member for the storage apparatus of FIGS. 1–4 according to alternative embodiments.

Referring now to FIG. 12, an alternative embodiment of side post member 18 is illustrated and designated as 18'. The illustrated side post member 18' includes a plurality of projections 80 extending therefrom that are configured to support articles suspended therefrom (e.g., grocery bags).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A storage apparatus that is configured to be attached to a vehicle seat, wherein the vehicle seat includes a seat portion and a backrest pivotally attached to the seat portion and that is movable between an upright, substantially vertical position and a folded, substantially horizontal position overlying the seat portion, and wherein the backrest includes a rear portion, the storage apparatus comprising:

a frame that is configured to be removably secured to the rear portion of the backrest, wherein the backrest includes a top portion and a headrest connected to the top portion via a support post, and wherein the frame comprises a hanger configured to removably attach the frame to the headrest support post of the headrest; and a panel that is configured to be removably secured to the frame in first and second positions, wherein the panel has a substantially horizontal orientation when secured to the frame in the first position when the storage apparatus is attached to the vehicle seat and the backrest is in the upright position, and wherein the panel has a substantially horizontal orientation when secured to the frame in the second position when the storage apparatus is attached to the vehicle seat and the backrest is in the folded position.

2. The storage apparatus of claim 1, wherein the panel comprises one or more cup holders.

3. The storage apparatus of claim 1, wherein the frame comprises a pair of elongated side members, each having opposite end portions and an arcuate intermediate portion extending therebetween, wherein the arcuate intermediate portions are in adjacent, spaced-apart relationship and bow outwardly away from the rear portion of the backrest when the frame is secured to the backrest, and wherein the side members are configured to removably secure the panel in the first and second positions.

4. The storage apparatus of claim 3, wherein the panel comprises a pair of opposite edge portions, wherein first and second pairs of notches are formed within the respective side members in mirror image relationship, wherein the first pair of notches are configured to slidably receive respective edge portions of the panel therein when the panel is in the first position, and wherein the second pair of notches are configured to slidably receive respective edge portions of the panel therein when the panel is in the second position.

5. The storage apparatus of claim 4, wherein at least one panel edge portion comprises a slot that communicates with a respective side member to removably interlock the panel to the respective side member.

6. The storage apparatus of claim 3, wherein when the frame is secured to the backrest the side members are configured to pivot between a stored position and an operative position, wherein the arcuate intermediate portions of the side members bow towards each other when the side members are in the stored position, and wherein the arcuate intermediate portions of the side members bow outwardly away from the rear portion of the backrest when the side members are in the operative position.

7. The storage apparatus of claim 3, wherein when the frame is secured to the backrest the side members are configured to pivot between a stored position and an operative position, wherein the arcuate intermediate portions of the side members bow away from each other when the side members are in the stored position, and wherein the arcuate intermediate portions of the side members bow outwardly away from the rear portion of the backrest when the side members are in the operative position.

8. The storage apparatus of claim 3, further comprising one or more hanging folders suspended between the side members when the frame is secured to the backrest and the backrest is in the folded position.

9. The storage apparatus of claim 1, wherein the frame comprises at least one projection extending therefrom that is configured to support articles suspended therefrom.

10. A storage apparatus that is configured to be attached to a vehicle seat, wherein the vehicle seat includes a seat portion and a backrest pivotally attached to the seat portion and movable between an upright, substantially vertical position and a folded, substantially horizontal position overlying the seat portion, and wherein the backrest includes a top and rear portion and a pair of headrests connected to the top portion via respective support posts, the storage apparatus comprising:

- an upper cross member, comprising a pair of headrest support post hangers extending therefrom, wherein each hanger is configured to be removably attached to a headrest support post of a respective headrest;
- a lower cross member; and
- a pair of elongated side members, each side member comprising opposite first and second end portions and an arcuate intermediate portion extending therebetween, wherein the first end portion of each side member is attached to the upper cross member and wherein the second end portion of each side member is attached to the lower cross member such that the arcuate intermediate portions of the side members are in adjacent, spaced-apart relationship; and
- a panel that is configured to be removably secured to the side members in first and second positions, wherein the panel has a substantially horizontal orientation when secured to the side members in the first position when the storage apparatus is attached to the vehicle seat and the backrest is in the upright position, and wherein the panel has a substantially horizontal orientation when secured to the side members in the second position when the storage apparatus is attached to the vehicle seat and the backrest is in the folded position.

11. The storage apparatus of claim 10, further comprising one or more hanging folders suspended between the side members when the storage apparatus is secured to the backrest and the back rest is in the folded position.

12. The storage apparatus of claim 10, wherein the panel comprises a pair of opposite edge portions, wherein first and second pairs of notches are formed within the respective side members in mirror image relationship, wherein the first pair of notches are configured to slidably receive respective edge portions of the panel therein when the panel is in the first position, and wherein the second pair of notches are configured to slidably receive respective edge portions of the panel therein when the panel is in the second position.

13. The storage apparatus of claim 10, wherein at least one panel edge portion comprises a slot that communicates with a respective side member to removably interlock the panel to the respective side member.

14. The storage apparatus of claim 10, wherein when the storage apparatus is secured to the backrest the side members are pivotally secured to the upper and lower cross members and are configured to pivot between a stored position and an operative position, wherein the arcuate intermediate portions of the side members bow towards each other when the side members are in the stored position, and wherein the arcuate intermediate portions of the side members bow outwardly away from the rear portion of the backrest when the side members are in the operative position.

15. The storage apparatus of claim 14, wherein the side members are configured to interlock with each other when in the stored position.

16. The storage apparatus of claim 10, wherein when the storage apparatus is secured to the backrest the side members are pivotally secured to the upper and lower cross members and are configured to pivot between a stored position and an operative position, wherein the arcuate intermediate portions of the side members bow away from each other when the side members are in the stored position, and wherein the arcuate intermediate portions of the side members bow outwardly away from the rear portion of the backrest when the side members are in the operative position.

17. The storage apparatus of claim 16, wherein the side members are configured to interlock with each other when in the stored position.

18. The storage apparatus of claim 10, wherein the panel comprises one or more cup holders.

19. The storage apparatus of claim 10, wherein the lower cross member is configured to be removably secured to the vehicle seat.

20. The storage apparatus of claim 10, further comprising a strap that is configured to be secured to the backrest and wherein the lower cross member is configured-to be removably secured to the strap.

21. The storage apparatus of claim 10, wherein the upper cross member comprises at least one projection extending therefrom that is configured to support articles suspended therefrom.

22. The storage apparatus of claim 10, wherein the lower cross member comprises at least one projection extending therefrom that is configured to support articles suspended therefrom.

23. The storage apparatus of claim 10, wherein at least one of the side members comprises at least one projection extending therefrom that is configured to support articles suspended therefrom.

24. A storage apparatus that is configured to be attached to a vehicle seat, wherein the vehicle seat has a backrest that includes a top and rear portion and a pair of headrests connected to the top portion via respective support posts, the storage apparatus comprising:

- an upper cross member, comprising a pair of headrest support post hangers extending therefrom, wherein each hanger is configured to be removably attached to a headrest support post of a respective headrest;

a lower cross member;

a pair of elongated side members, each side member comprising opposite first and second end portions and an arcuate intermediate portion extending therebetween, wherein the first end portion of each side member is pivotally attached to the upper cross member and wherein the second end portion of each side member is pivotally attached to the lower cross member, wherein the side members are configured to pivot between a stored position and an operative position, wherein when the storage apparatus is attached to the vehicle seat the arcuate intermediate portions of the side members are in adjacent, spaced-apart relationship and bow outwardly away from the rear portion of the backrest when the side members are in the operative position;

a pair of notches formed within the respective side members in mirror image relationship; and a panel comprising opposite edge portions, wherein each edge portion is configured to slidably communicate with a respective notch in the pair of notches such that the panel is supported by the side members in a substantially horizontal orientation.

25. The storage apparatus of claim 24, wherein at least one panel edge portion comprises a slot that communicates with a respective side member to removably interlock the panel to the respective side member.

26. The storage apparatus of claim 24, wherein the side members are configured to interlock with each other when in the stored position.

27. The storage apparatus of claim 24, further comprising a strap that is configured to be secured to the backrest and wherein the lower cross member is configured to be removably secured to the strap.

28. The storage apparatus of claim 24, wherein the upper cross member comprises at least one projection extending therefrom that is configured to support articles suspended therefrom.

29. The storage apparatus of claim 24, wherein the lower cross member comprises at least one projection extending therefrom that is configured to support articles suspended therefrom.

30. The storage apparatus of claim 24, wherein at least one of the side members comprises at least one projection extending therefrom that is configured to support articles suspended therefrom.

31. The storage apparatus of claim 24, further comprising a plurality of pairs of notches formed within the respective side members in spaced-apart, mirror image relationship, and wherein the respective notches of each pair of notches are configured to slidably receive the opposite edge portions of the panel therein such that the panel can be supported in different positions.

32. The storage apparatus of claim 31, further comprising a plurality of panels, each panel comprising a pair of opposite edge portions, and wherein the respective notches of each pair of notches are configured to slidably receive the opposite edge portions of a respective panel therein such that the panels are supported in a substantially horizontal orientation in adjacent, spaced-apart relationship.

33. A vehicle seat, comprising:

a seat portion;

a backrest pivotally attached to the seat portion and movable between an upright, substantially vertical position and a folded, substantially horizontal position overlying the seat portion, and wherein the backrest comprises a rear portion; and a storage apparatus, comprising:

a frame that is removably secured to the rear portion of the backrest, wherein the backrest includes a top portion and a headrest connected to the ton portion via a support post, and wherein the frame comprises a hanger that is removably attached to the headrest support post of the headrest; and a panel that is configured to be removably secured to the frame in first and second positions, wherein the panel has a substantially horizontal orientation when secured to the frame in the first position and when the backrest is in the upright position, and wherein the panel has a substantially horizontal orientation when secured to the frame in the second position and when the backrest is in the folded position.

34. The vehicle seat of claim 33, wherein the panel comprises one or more cup holders.

35. The vehicle seat of claim 33, wherein the frame comprises at least one projection extending therefrom that is configured to support articles suspended therefrom.

36. The vehicle seat of claim 33, wherein the frame comprises a pair of elongated side members, each having opposite end portions and an arcuate intermediate portion extending therebetween, wherein the arcuate intermediate portions are in adjacent, spaced-apart relationship and bow outwardly away from the rear portion of the backrest when the frame is secured to the backrest, and wherein the side members are configured to removably secure the panel in the first and second positions.

37. The vehicle seat of claim 36, wherein the panel comprises a pair of opposite edge portions, wherein first and second pairs of notches are formed within the respective side members in mirror image relationship, wherein the first pair of notches are configured to slidably receive respective edge portions of the panel therein when the panel is in the first position, and wherein the second pair of notches are configured to slidably receive respective edge portions of the panel therein when the panel is in the second position.

38. The vehicle seat of claim 37, wherein at least one panel edge portion comprises a slot that communicates with a respective side member to removably interlock the panel to the respective side member.

39. The vehicle seat of claim 36, wherein the side members are configured to pivot between a stored position and an operative position, wherein the arcuate intermediate portions of the side members bow towards each other when the side members are in the stored position, and wherein the arcuate intermediate portions of the side members bow outwardly away from the rear portion of the backrest when the side members are in the operative position.

40. The vehicle seat of claim 36, wherein the side members are configured to pivot between a stored position and an operative position, wherein the arcuate intermediate portions of the side members bow away from each other when the side members are in the stored position, and wherein the arcuate intermediate portions of the side members bow outwardly away from the rear portion of the backrest when the side members are in the operative position.

41. The vehicle seat of claim 36, further comprising one or more hanging folders suspended between the side members when the backrest is in the folded position.

42. A vehicle seat, comprising:

a seat portion;

a backrest pivotally attached to the seat portion and movable between an upright, substantially vertical position and a folded, substantially horizontal position overlying the seat portion, and wherein the backrest comprises a top and rear portion and a pair of headrests connected to the top portion via respective support posts; and a storage apparatus, comprising:
an upper cross member, comprising a pair of headrest support post hangers extending therefrom, wherein each hanger is removably attached to a respective headrest support post of a respective headrest;
a lower cross member; and
a pair of elongated side members, each side member comprising opposite first and second end portions and an arcuate intermediate portion extending therebetween, wherein the first end portion of each side member is attached to the upper cross member and wherein the second end portion of each side member is attached to the lower cross member such that the arcuate intermediate portions of the side members are in adjacent, spaced-apart relationship; and
a panel that is configured to be removably secured to the side members in first and second positions, wherein the panel has a substantially horizontal orientation when secured to the side members in the first position and when the backrest is in the upright position, and wherein the panel has a substantially horizontal orientation when secured to the side members in the second position and when the backrest is in the folded position.

43. The vehicle seat of claim 42, wherein at least one of the side members comprises at least one projection extending therefrom that is configured to support articles suspended therefrom.

44. The vehicle seat of claim 42, further comprising one or more hanging folders suspended between the side members when the backrest is in the folded position.

45. The vehicle seat of claim 42, wherein the panel comprises a pair of opposite edge portions, wherein first and second pairs of notches are formed within the respective side members in mirror image relationship, wherein the first pair of notches are configured to slidably receive respective edge portions of the panel therein when the panel is in the first position, and wherein the second pair of notches are configured to slidably receive respective edge portions of the panel therein when the panel is in the second position.

46. The vehicle seat of claim 42, wherein at least one panel edge portion comprises a slot that communicates with a respective side member to removably interlock the panel to the respective side member.

47. The vehicle seat of claim 42, wherein the side members are pivotally secured to the upper and lower cross members and are configured to pivot between a stored position and an operative position, wherein the arcuate intermediate portions of the side members bow towards each other when the side members are in the stored position, and wherein the arcuate intermediate portions of the side members bow outwardly away from the rear portion of the backrest when the side members are in the operative position.

48. The vehicle seat of claim 47, wherein the side members are configured to interlock with each other when in the stored position.

49. The vehicle seat of claim 42, wherein the side members are pivotally secured to the upper and lower cross members and are configured to pivot between a stored position and an operative position, wherein the arcuate intermediate portions of the side members bow away from each other when the side members are in the stored position, and wherein the arcuate intermediate portions of the side members bow outwardly away from the rear portion of the backrest when the side members are in the operative position.

50. The vehicle seat of claim 49, wherein the side members are configured to interlock with each other when in the stored position.

51. The vehicle seat of claim 42, wherein the panel comprises one or more cup holders.

52. The vehicle seat of claim 42, wherein the lower cross member is removably secured to the vehicle seat.

53. The vehicle seat of claim 42, further comprising a strap secured to the backrest and wherein the lower cross member is removably secured to the strap.

54. The vehicle seat of claim 42, wherein the upper cross member comprises at least one projection extending therefrom that is configured to support articles suspended therefrom.

55. The vehicle seat of claim 42, wherein the lower cross member comprises at least one projection extending therefrom that is configured to support articles suspended therefrom.

56. A vehicle seat, comprising:
a backrest comprising a top and rear portion and a pair of headrests connected to the top portion via respective support posts; and
a storage apparatus, comprising:
an upper cross member, comprising a pair of headrest support post hangers extending therefrom, wherein each hanger is removably attached to a respective headrest support post of a respective headrest;
a lower cross member;
a pair of elongated side members, each side member comprising opposite first and second end portions and an arcuate intermediate portion extending therebetween, wherein the first end portion of each side member is pivotally attached to the upper cross member and wherein the second end portion of each side member is pivotally attached to the lower cross member, wherein the side members are configured to pivot between a stored position and an operative position, wherein the arcuate intermediate portions of the side members are in adjacent, spaced-apart relationship and bow outwardly away from the rear portion of the backrest when the side members are in the operative position;
a pair of notches formed within the respective side members in mirror image relationship; and
a panel comprising opposite edge portions, wherein each edge portion is configured to slidably communicate with a respective notch in the pair of notches such that the panel is supported by the side members in a substantially horizontal orientation.

57. The vehicle seat of claim 56, further comprising a plurality of pairs of notches formed within the respective side members in spaced-apart, mirror image relationship, and wherein the respective notches of each pair of notches are configured to slidably receive the opposite edge portions of the panel therein such that the panel can be supported in different positions.

58. The vehicle seat of claim 57, further comprising a plurality of panels, each panel comprising a pair of opposite edge portions, and wherein the respective notches of each pair of notches are configured to slidably receive the opposite edge portions of a respective panel therein such that the panels are supported in a substantially horizontal orientation in adjacent, spaced-apart relationship.

59. The vehicle seat of claim 56, wherein the side members are configured to interlock with each other when in the stored position.

60. The vehicle seat of claim 56, further comprising a strap secured to the backrest and wherein the lower cross member is removably secured to the strap.

61. The vehicle seat of claim 56, wherein the upper cross member comprises at least one projection extending therefrom that is configured to support articles suspended therefrom.

62. The vehicle seat of claim 56, wherein the lower cross member comprises at least one projection extending therefrom that is configured to support articles suspended therefrom.

63. The vehicle seat of claim 56, wherein at least one of the side members comprises at least one projection extending therefrom that is configured to support articles suspended therefrom.

64. The vehicle seat of claim 56, wherein at least one panel edge portion comprises a slot that communicates with a respective side member to removably interlock the panel to the respective side member.

* * * * *

UNITED STATES PATENT AND TRADEMARK OFFICE
CERTIFICATE OF CORRECTION

PATENT NO. : 6,607,241 B2
DATED : August 19, 2003
INVENTOR(S) : Johnston

It is certified that error appears in the above-identified patent and that said Letters Patent is hereby corrected as shown below:

<u>Column 10,</u>
Line 7, should read -- portion and a headrest connected to the top portion --

Signed and Sealed this

Thirteenth Day of April, 2004

JON W. DUDAS
*Acting Director of the United States Patent and Trademark Office*